United States Patent
Scholl et al.

(10) Patent No.: US 6,521,698 B2
(45) Date of Patent: Feb. 18, 2003

(54) RUBBERS WITH POLYETHER SIDE GROUPS

(75) Inventors: Thomas Scholl, Bergisch Gladbach (DE); Jürgen Trimbach, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 4 days.

(21) Appl. No.: 09/791,344

(22) Filed: Feb. 22, 2001

(65) Prior Publication Data

US 2001/0031821 A1 Oct. 18, 2001

(30) Foreign Application Priority Data

Mar. 1, 2000 (DE) .......................... 100 09 909

(51) Int. Cl.$^7$ ................................ C08K 3/00
(52) U.S. Cl. ..................................... 524/572
(58) Field of Search .......................... 524/572

(56) References Cited

U.S. PATENT DOCUMENTS

| | | |
|---|---|---|
| 3,842,111 A | 10/1974 | Meyer-Simon et al. ............ 260/448.2 E |
| 3,873,489 A | 3/1975 | Thurn et al. ......... 260/33.6 AQ |
| 3,997,356 A | 12/1976 | Thurn et al. ............ 106/288 Q |
| 4,076,550 A | 2/1978 | Thurn et al. ............ 106/288 Q |
| 4,124,657 A | * 11/1978 | Martin ..................... 260/879 |
| 4,336,344 A | * 6/1982 | Craigie ....................... 525/31 |
| 4,577,002 A | * 3/1986 | Broekhuis .................. 526/181 |
| 5,227,425 A | 7/1993 | Rauline ..................... 524/493 |
| 5,409,969 A | 4/1995 | Hamada .................... 523/213 |
| 5,470,895 A | * 11/1995 | Kidder ...................... 523/335 |
| 5,663,226 A | 9/1997 | Scholl et al. ............... 524/262 |
| 6,130,277 A | 10/2000 | Okamura et al. ........... 524/306 |
| 6,268,421 B1 | 7/2001 | Dittrich et al. ............. 524/266 |

FOREIGN PATENT DOCUMENTS

CA 2186060 3/1997

OTHER PUBLICATIONS

Hoben–Weyl, Methoden der Organischen Chemie Thieme Verlag, Stuttgart (month unavailable) 1987, vol. E2, pp. 114–134, J. Witte, "Ionisch Initiierte Polymerisation von Monomeren mit C,C–Doppelbindungen".

I. Franta, Elastomers & Rubber Compounding Material, Elsevier, (month unavailable) 1989, pp. 73–74, 92–94, "Addition Polymerization by Anionic Mechanism".

* cited by examiner

*Primary Examiner*—Edward J. Cain
(74) *Attorney, Agent, or Firm*—Joseph C. Gil; Noland J. Cheung; Jennifer R. Seng

(57) ABSTRACT

The present invention relates to rubbers based on diolefins with a particular lateral polyether group content, mixtures thereof with fillers and the use of said rubbers and mixtures for the preparation of rubber vulcanizates with improved tear propagation resistance and favorable dynamic damping. More particularly, the rubbers according to the present invention are suitable for the manufacture of highly reinforced rubber molded articles, particularly for tires of vehicles, which are used both in road traffic and off-road.

7 Claims, No Drawings

RUBBERS WITH POLYETHER SIDE GROUPS

FIELD OF THE INVENTION

The present invention relates to rubbers based on diolefins with a particular lateral polyether group content and to the use of said rubbers for the preparation of rubber vulcanizates with improved tear propagation resistance and favorable dynamic damping. Additionally, the rubbers according to the present invention are suitable for the manufacture of highly reinforced rubber molded articles, particularly for tires of vehicles which are used both in road traffic and off-road because, in addition to high wet skid resistance, low rolling resistance, high road abrasion resistance, they have high tear propagation resistance with relatively good ability to withstand high stresses off-road.

BACKGROUND OF THE INVENTION

Anionically polymerized solution rubbers containing double bonds such as solution polybutadiene and solution styrene/butadiene rubbers have advantages over corresponding emulsion rubbers in the manufacture of low rolling resistance tire treads. The advantages lie, i.a. in the ability to control the vinyl content and the associated glass transition temperature and molecule branching. This results in particular advantages in practical application in the relationship between the wet skid resistance and rolling resistance of the tire. U.S. Pat. No. 5,227,425 describes the manufacture of tire treads from a solution SBR rubber and silica. A disadvantage of such rubber mixtures is the limited tear propagation resistance. New types of motor vehicles which may be used both in road traffic and off-road ("Multi Utility Vehicles"), in addition to the known requirements in terms of rolling resistance, wet skid resistance and abrasion behavior, impose new demands in terms of high tear propagation resistance for the operation of the vehicle off-road.

Rubber mixtures of solution rubbers based on dienes with lateral functional groups are also described in German patent application no. 198 324 596. The hydroxyl groups described there lead to improvements in road-related properties such as rolling resistance, wet braking stability and abrasion, but for off-road use, further improvements in tear propagation resistance are desirable, especially in the silica-filled rubber mixtures with particularly low rolling resistance.

Rubber mixtures containing polyethers as additives are also described in EP-A 869 145. The polyethers, however, are used as antistatic agents. No details about the tear propagation resistance are given in EP-A 869 145.

SUMMARY OF THE INVENTION

The present invention provides for rubbers of diolefins and optionally other monomers with a relatively high content of effective polyether side groups, from which it is possible to manufacture tires with improved properties for both road and off-road use, more particularly with low rolling resistance, relatively high wet skid resistance, low abrasion and high tear propagation resistance.

Surprisingly, it has now been found that solution rubbers of diolefins with a particular hydroxyl group-free polyether side group content have particularly favorable properties for the manufacture of tires for the multi utility vehicles described.

DETAILED DESCRIPTION OF THE INVENTION

Therefore, the present invention provides rubbers based on diolefins and optionally other monounsaturated monomers containing 10 to 80 wt. %, preferably 20 to 60 wt. % of 1,2-bound diolefins (vinyl content), which are characterized in that they contain 0.01 to 20 wt. %, preferably 0.1 to 15 wt. %, most preferably 0.5 to 10 wt. %, based on the total amount of rubber, of hydroxyl group-free polyether side groups.

The hydroxyl group-free polyether side groups correspond to the formulae (I) or (II)

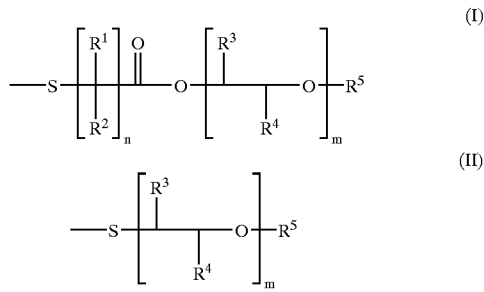

wherein

| | |
|---|---|
| $R^1$ and $R^2$ | independently of one another, is hydrogen or a $C_1$ to $C_6$-alkyl radical or a —COO—(CHR³—CHR⁴—O—)$_m$—R⁵ radical, |
| $R^3$ and $R^4$ | independently of one another and regardless of their meaning in the other repeat units, stand for hydrogen or a methyl or ethyl group, |
| $R^5$ | means a linear, branched or cyclic $C_1$ to $C_{24}$-alkyl radical, $C_6$ to $C_{18}$-aryl or $C_7$ to $C_{24}$-arylalkyl radical and |
| n | stands for an integer from 1 to 6, preferably 1 to 4, and |
| m | stands for an integer from 1 to 100, preferably 3 to 30 |

Polyether side groups corresponding to the following formulae are preferred:

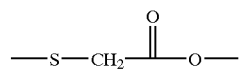

Polyethylene oxide polyether —$R^5$
Molecular weight 132 to about 1500

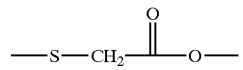

Polypropylene oxide polyether —$R^5$
Molecular weight 174 to about 1500

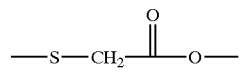

Propylene oxide/ethylene oxide mixed polyether —$R^5$
Molecular weight 146 to about 1500

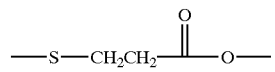

Polyethylene oxide polyether —$R^5$
Molecular weight 132 to about 1500

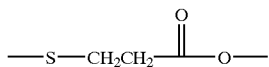

Polypropylene oxide polyether —$R^5$
Molecular weight 174 to about 1500

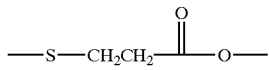

Polypropylene oxide/ethylene oxide mixed polyether —$R^5$
Molecular weight 146 to about 1500

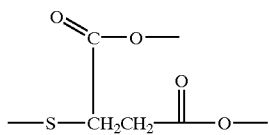

Polyethylene oxide polyether —$R^5$
Molecular weight 132 to about 1500
Polyethylene oxide polyether —$R^5$
Molecular weight 132 to about 1500

Polyethylene oxide polyether —$R^5$
Molecular weight 174 to about 1500

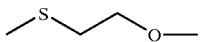

Polyethylene oxide polyether —$R^5$
Molecular weight 132 to about 1500

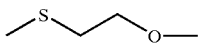

Polypropylene oxide/ethylene oxide mixed polyether —$R^5$
Molecular weight 146 to about 1500

The $R^5$ radicals herein stand for $C_1$ to $C_{24}$-alkyl radicals, preferably $C_1$ to $C_8$-alkyl radicals, $C_6$ to $C_{18}$-aryl radicals, preferably $C_6$ to $C_{10}$-aryl radicals, and $C_7$ to $C_{24}$-arylalkyl radicals, preferably $C_7$ to $C_{18}$-arylalkyl radicals. More preferred $R^5$ radicals are methyl, ethyl, propyl, butyl, hexyl, octyl, dodecyl, octadecyl, phenyl, octyl-phenyl, nonylphenyl and dodecylphenyl groups. The most preferred groups are methyl, ethyl, propyl, butyl, hexyl and octyl groups.

Preferred rubbers according to the present invention are those containing 0.1 to 15 wt. %, based on the total amount of rubber, of polyether side groups corresponding to formula (I).

Preferred rubbers according to the present invention contain, in addition to the diolefins, 0.1 to 50 wt. %, preferably 10 to 40 wt. %, based on the total amount of rubber, of vinylaromatic monomers incorporated by polymerization as further unsaturated monomers.

Moreover, the rubbers according to the present invention may also contain a 1,4-trans proportion of up to 60 wt. %, preferably from 10 to 40 wt. %, based on the total amount of diolefin incorporated by polymerization.

Diolefins used according to the present invention for the preparation of the rubbers include, in particular, 1,3-butadiene, isoprene, 1,3-pentadiene, 2,3-diemethylbutadiene, 1-vinyl-1,3-butadiene and/or 1,3-hexadiene. 1,3-Butadiene and/or isoprene are preferred.

Examples of vinylaromatic monomers which may be used for polymerization include styrene, o-, m- and p-methylstyrene, p-tert.-butylstyrene, α-methylstyrene, vinyl naphthalene, divinylbenzene, trivinylbenzene and/or divinylnaphthalene. Styrene is particularly preferred.

The rubbers according to the present invention have molecular weights (number-average) from about 50,000 to 2,000,000, preferably 100,000 to 1,000,000, glass transition temperatures from −120° C. to +20° C., preferably −60° C. to 0° C., and Mooney viscosities ML 1+4 (100° C.) from 10 to 200, preferably from 30 to 150.

The rubbers according to the present invention are prepared preferably by polymerization in solution in an inert organic solvent suitable for the purpose, using a suitable catalyst, preferably an anionic catalyst, for example, based on an alkali metal such as n-butyllithium. In addition, the well-known randomizers and control agents may be used in this polymerization to control the microstructure of the rubber. Anionic solution polymerization reactions of this kind are well known and described, e.g., in I. Franta Elastomers and Rubber Compounding Materials; Elsevier 1989, page 73–74, 92–94 and in Houben-Weyl, Methoden der Organischen Chemie, Thieme Verlag, Stuttgart, 1987, Vol. E 20, page 114–134.

The introduction of the polyether side groups into the rubber takes place preferably after polymerization of the monomers used has taken place in solution by reacting the polymers obtained, preferably in the presence of well known radical initiators, with polyether mercaptans corresponding to the formulae (III) or (IV)

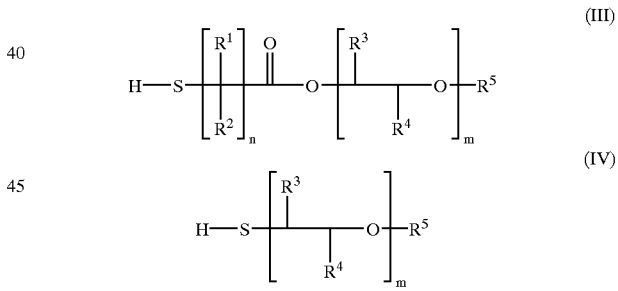

wherein $R^1$ to $R^5$ and n and m have the meaning given above.

Preferred polyether mercaptans corresponding to formula (III) are monoesters of thioglycolic acid, 2- and 3-mercaptopropionic acid, mercaptobutyric acid and diesters of mercaptosuccinic acid with polyethylene oxide polyethers, polypropylene oxide polyethers and polyethylene oxide/propylene oxide mixed polyethers initiated on monofunctional $C_1$ to $C_{24}$ alcohols, preferably $C_1$ to $C_8$ alcohols, $C_6$ to $C_{18}$-aryl alcohols, preferably $C_6$ and $C_{10}$-aryl alcohols, and $C_7$ to $C_{24}$-arylalkyl alcohols, preferably $C_7$ to $C_{18}$-arylalkyl alcohols, the molecular weight of the polyether being preferably in the range from 164 (triethylene glycol monomethylester) to about 1500, more preferably from 300 to 1000. Particularly preferred monofunctional initiator alcohols are methyl, ethyl, propyl, butyl, hexyl, octyl, dodecyl, octadecyl alcohol, phenol, octyl phenol, nonyl phenol and dodecyl phenol, where methyl, ethyl, propyl, butyl, hexyl and octyl alcohol are most preferred. The preparation of these polyethers is described in the prior art. Suitable polyethers are available commercially.

More preferred polyether mercaptans (IV) are mercapto-terminated polyethylene oxide polyethers, polypropylene oxide polyethers and polyethylene oxide/propylene oxide mixed polyethers initiated on monofunctional $C_1$ to $C_{24}$ alcohols, preferably $C_1$ to $C_8$ alcohols, $C_6$ to $C_{18}$-aryl alcohols, preferably $C_6$ and $C_{10}$-aryl alcohols, and $C_7$ to $C_{24}$-arylalkyl alcohols, preferably $C_7$ to $C_{18}$-arylalkyl alcohols, the molecular weight of the mercapto-terminated polyether being preferably from 180 (ω-mercapto-tetraethylene glycol monomethyl ether) to about 1500, most preferably from about 300 to about 1000. Such polyether mercaptans (IV) can be prepared in an inherently known manner, e.g., from the corresponding hydroxyl-terminated polyethers by reaction with hydrogen sulfide.

The reaction of the polyether mercaptans (III) or (IV) with the unmodified rubbers may be carried out in solvent or solvent-free, e.g., in a kneader or extruder at temperatures from 20° C. to 220° C., preferably 70° C. to 170° C. The reaction times range from a few minutes to several hours.

Examples of suitable solvents include hydrocarbons such as pentane, hexane, cyclohexane, benzene and/or toluene.

Preferred temperatures for the reaction of the polyether mercaptans (III) or (IV) with the unmodified rubbers in solution are 60° C. to 150° C. and for the reaction in bulk, e.g., in an internal mixer, 100° C. to 200° C.

Examples of preferred radical initiators include peroxides, particularly acyl peroxides such as dilauroyl peroxide and dibenzoyl peroxide and ketal peroxides, such as di-tert. butylperoxytrimethyl-cyclohexane, and also azo initiators such as azobis-isobutyronitrile, and benzpinacol silyl ether. Moreover, it is possible to operate in the presence of photoinitiators and visible or WV light.

The present invention also provides rubber mixtures of the rubbers according to the present invention with the fillers known and used in the rubber industry; these include both the active and the inactive fillers. They include:

fine-particle silicas prepared, e.g., by precipitation of solutions of silicates or flame hydrolysis of silicon halides with specific surfaces from 5 to 1000, preferably 20 to 400 $m^2/g$ (BET surface) and with primary particle sizes from 10 to 400 nm. The silicas may optionally also be present as mixed oxides with other metal oxides such as Al, Mg, Ca, Ba, Zn, Zr, Ti oxides;

synthetic silicates such as aluminum silicate, alkaline earth silicate such as magnesium silicate or calcium silicate, with BET surfaces from 20 to 400 $m^2/g$ and primary particle diameters from 10 to 400 nm;

natural silicates such as kaolin and other naturally occurring silica;

glass fibers and glass fiber products (mats, strands) or microglass beads;

metal oxides such as zinc oxide, calcium oxide, magnesium oxide, aluminum;

metal carbonates such as magnesium carbonate, calcium carbonate, zinc carbonate;

metal hydroxides such as, e.g., aluminum hydroxide, magnesium hydroxide;

carbon blacks. The carbon blacks to be used here are prepared by the lamp black, furnace or channel black process and have BET surfaces from 20 to 200 $m^2/g$, e.g., SAF, ISAF, HAF, FEF or GPF carbon blacks;

rubber gels rubber powder which was obtained, for example, by grinding rubber vulcanizates.

Fillers used are preferably fine-particle silicas and/or carbon blacks.

The amount of fillers is usually 10 to 300 parts by wt., preferably 30 to 150 parts by wt., based on 100 parts by wt. of rubber.

The fillers mentioned may be used on their own or in mixture. In a preferred embodiment, the rubber mixtures contain, as fillers, a mixture of light fillers such as fine-particle silicas, and carbon blacks, wherein the mixing ratio of light fillers to carbon blacks in terms of weight is 1:(0.05 to 20), preferably 1:(0.1 to 10), the amount of filler being in total 30 to 150 parts by wt., preferably 40 to 120 parts by wt., based on 100 parts by wt. of rubber.

Of course, the rubbers according to the present invention may be blended with other conventional rubbers, e.g., with natural rubber and synthetic rubbers.

Preferred synthetic rubbers are described, for example, in W. Hofmann, Kautschuk-technologie, Gentner Verlag, Stuttgart 1980 and I. Franta, Elastomers and Rubber Compounding Materials, Elsevier, Amsterdam 1989. They include, i.a.

| | |
|---|---|
| BR | polybutadiene |
| ABR | butadiene/acrylic acid C1–4 alkylester copolymers |
| CR | polychloroprene |
| IR | polyisoprene |
| SBR | styrene/butadiene copolymers with styrene contents from 1 to 60, preferably 20 to 50 wt. % |
| IIR | isobutylene/isoprene copolymers |
| NBR | butadiene/acrylonitrile copolymers with acrylonitrile contents from 5 to 60, preferably 10 to 40 wt. % |
| HNBR | partially hydrogenated or fully hydrogenated NBR rubber |
| EPDM | ethylene/propylene diene copolymers | and mixtures of such rubbers.

In particular, natural rubber, emulsion SBR and solution SBR rubbers with a glass transition temperature above −50° C., which may optionally be modified with silyl ethers or other functional groups according to EP-A 447 066, polybutadiene rubber with a high 1,4-cis content (>90%) which was prepared with catalysts based on Ni, Co, Ti or Nd, and polybutadiene rubber with a vinyl content of up to 75% and mixtures thereof are of interest for the preparation of motor vehicle tires.

Of course, the rubber mixtures according to the present invention may contain other rubber auxiliaries which are used, for example, for the further crosslinking, of the vulcanizates prepared from the rubber mixtures, or which improve the physical properties of the vulcanizates prepared from the rubber mixtures according to the present invention for their particular purpose.

Examples of additional crosslinking agents used include sulfur or sulfur-yielding compounds or peroxides. Sulfur or sulfur-yielding compounds are used preferably in amounts from about 0.01 to 3 parts by wt., based on rubber. Moreover, as mentioned above, the rubber mixtures according to the present invention may contain further auxiliaries such as the well known reaction accelerators, antioxidants, heat stabilizers, light stabilizers, anti-ozonants, processing aids, reinforcing resins, e.g., phenolic resins, steel cord adhesion promoters such as, e.g., silica/resorcinol/hexamethylene tetramine or cobalt naphthenate, plasticizers, tackifiers, blowing agents, dyes, pigments, waxes, extenders, organic acids, retarders, metal oxides and activators.

The rubber auxiliaries according to the present invention are used in the conventional well known amounts, the amount used depending on the later intended use of the rubber mixtures. For example, amounts of rubber auxiliaries in the range from 2 to 70 parts by wt., based on 100 parts by wt. of rubber are customary.

As mentioned above, additional rubbers may be added to the rubber mixtures according to the present invention. The amount thereof is usually in the range from 0.5 to 70, preferably 10 to 50 wt. %, based on the total amount of rubber in the rubber mixture. The amount of additionally added rubbers depends again on the particular intended use of the rubber mixtures according to the present invention.

The use of additional filler activators is particularly advantageous for the rubber mixtures according to the present invention which contain highly reactive silica fillers. Preferred filler activators are silyl ethers containing sulfur, particularly bis-(trialkoxysilylalkyl)polysulfides of the kind described in DE-A 2 141 159 and DE-A 2 255 577. Moreover, oligomeric and/or polymeric silyl ethers containing sulfur corresponding to the description in DE-A 4 435 311 and EP-A 670 347 are also suitable. Mercaptoalkyltrialkoxy silanes, particularly mercaptopropyltriethoxy silane and thiocyanatoalkylsilyl ethers (see DE-A 19 544 469), amino group-containing silyl ethers such as 3-aminopropyltriethoxy silane and N-oleyl-N-propyltrimethoxy silane, and trimethylolpropane may also be used. The filler activators are used in conventional amounts, i.e. in amounts from 0.1 to 15 parts by wt., based on 100 parts by wt. of rubber.

The rubber mixtures according to the present invention may be prepared, e.g., by mixing the rubbers according to the present invention with the corresponding fillers and the rubber auxiliaries in suitable mixing apparatus such as kneaders, rollers or extruders, or by mixing the solutions of the rubber with the fillers followed by removal of the solvent, e.g., by steam distillation.

The present invention also provides the use of the rubber mixtures according to the present invention for the preparation of vulcanizates which in turn are used for the manufacture of preferably highly reinforced rubber molded articles, particularly for the manufacture of tires and tire parts.

EXAMPLES

Example 1
Preparation of a Polyether Mercaptan 275 g of polyethylene glycol monomethyl ether with the molecular weight 550 were heated with 53 g of 3-mercaptopropionic acid, 0.2 g of p-toluenesulfonic acid and 0.5 g of Vulkanox BKF (phenolic antioxidant from Bayer AG) in 360 ml of toluene for 17 hours over a water separator. After distillation of the solvent under vacuum (0.1 mm) at 120° C., 323 g of a colorless oil were obtained.

Example 2
Solution SBR Rubber with Polyether Side Groups 6.25 g of the polyether mercaptan from Example 1 and 0.5 g of dilauroyl peroxide were added at 80° C. to a solution of 500 g of solution SBR rubber, Buna VSL 5025-0 (Bayer AG, bound styrene content 25 t. %, 1,2-bound butadiene content 50 wt. %, 20% of the butadiene were incorporated by polymerization in the 1,4-trans form) in 4l of cyclohexane. The mixture was then stirred for 5 hours at 80° C. Then 2.5 g of stabilizer Vulkanox® 4020 (Bayer AG) were added and the solvent removed by steam distillation. After drying at 70° C. under vacuum, 508.5 g of a colorless rubber with a Mooney viscosity ML 1+4 (100° C.) of 80 were obtained. Bound polyether side group content 1.24 wt. % (based on total rubber). 1,2-bound butadiene content (vinyl content) 50 wt. %, glass transition temperature: −17° C.

Examples 3–4

The same procedure as in Example 2 was followed, the amounts of polyether mercaptan from Example 1 and of dilauroyl peroxide used in the example being replaced by the amounts given in the table below:

| Example no. | Polyether mercaptan ex. 1 | Dilauroyl peroxide | Viscosity ML 1 + 4 | Glass transition temperature |
|---|---|---|---|---|
| 3 | 12.5 g | 1 g | 100 | −19° C. |
| 4 | 25 g | 1 g | 88 | −19° C. |

Examples 5–7
Rubber Mixtures and Vulcanizates

The following rubber mixtures were prepared in a 1.5 l kneader. (Mixing time: 5 minutes, speed 60 rpm). Sulfur and accelerator were added at the end at 50° C. on a roller:

|  | Comparison 5 | Example 6 | Example 7 |
|---|---|---|---|
| mixed in the kneader: | | | |
| Sol.-SBR Buna VSL 5025-0 (Bayer AG) | 70 | 0 | 0 |
| Polyether sol.-SBR ex. 3 | 0 | 70 | 0 |
| Polyether sol.-SBR ex. 4 | 0 | 0 | 70 |
| Polybutadiene Buna CB 25 (Bayer AG) | 30 | 30 | 30 |
| Silica Vulkasil S (Bayer AG) | 70 | 70 | 70 |
| Carbon black N 121 (Degussa Hüls) | 10 | 10 | 10 |
| Aromat. mineral oil Enerthene 1849-1 (BP) | 37.5 | 37.5 | 37.5 |
| Zinc oxide | 3 | 3 | 3 |
| Stearic acid | 1 | 1 | 1 |
| Antioxidant Vulkanox HS (Bayer AG) | 1 | 1 | 1 |
| Antioxidant Vulkanox 4020 (Bayer AG) | 1 | 1 | 1 |
| Silane Si 69 (Degussa Hüls) | 5.6 | 5.6 | 5.6 |
| added on the roller: | | | |
| Sulfur | 1.5 | 1.5 | 1.5 |
| Accelerator Vulkacit CZ (Bayer AG) | 1.8 | 1.8 | 1.8 |
| Accelerator Vulkacit D (Bayer AG) | 2 | 2 | 2 | the mixtures were then vulcanized for 20 minutes at 170° C. The following vulcanizate properties were found:

| | | | |
|---|---|---|---|
| Modulus 100% elongation (MPa) | 3.2 | 3.2 | 3.3 |
| Modulus 300% elongation (MPa) | 10.9 | 12.6 | 13.4 |
| Elongation at break (%) | 400 | 340 | 320 |
| Rebound resilience at 23° C. (%) | 30 | 29 | 28 |
| Rebound resilience at 70° C. (%) | 51 | 55 | 57 |
| Shore A hardness (23° C.) | 70 | 65 | 64 |
| Abrasion DIN 53.516 (mm³) | 84 | 75 | 78 |
| Tear propagation resistance DIN 53.515 (N/mm) | 28.7 | 40 | 40 |

The test results confirm that the solution rubbers with the polyether side group content according to the present invention yield vulcanizates with improved dynamic damping properties (low rebound resilience at 23° C. correlates with relatively high wet skid resistance in tires, relatively high rebound resilience at 70° C. correlates with relatively low rolling resistance in tires) and relatively low abrasion with a markedly improved tear propagation resistance level.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Rubbers comprising diolefins and optionally other monounsaturated monomers wherein said rubber comprise 10 to 80 wt. % of 1,2-bound diolefins (vinyl content), wherein said diolefin comprises 0.01 to 20 wt. %, based on the total amount of rubber, of hydroxyl group-free polyether side groups, wherein said hydroxyl group-free polyether side group is of the formulae (I) or (II):

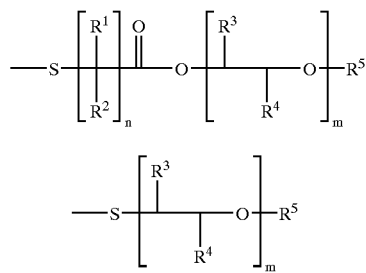

wherein

| | |
|---|---|
| $R^1$ and $R^2$ | independently of one another, is hydrogen or a $C_1$ to $C_6$-alkyl radical or a —COO—$(CHR^3$—$CHR^4$—O—$)_m$—$R^5$ radical, |
| $R^3$ and $R^4$ | independently of one another, is hydrogen or a methyl or ethyl group, |
| $R^5$ | means a linear, branched or cyclic $C_1$ to $C_{24}$-alkyl radical, $C_6$ to $C_{18}$-aryl or $C_7$ to $C_{24}$-arylalkyl radical |
| and | |
| n | is an integer from 1 to 6, and |
| m | is an integer from 1 to 100. |

2. Rubbers according to claim 1, wherein the rubbers comprise 0.1 to 50 wt. %, based on the total amount of rubber, of vinylaromatic monomers, which are incorporated by polymerization.

3. Rubber mixtures comprising rubbers comprising diolefins and optionally other monounsaturated monomers wherein said rubber comprises 10 to 80 wt. % of 1,2-bound diolefins (vinyl content), wherein said diolefin comprises 0.01 to 20 wt. %, based on the total amount of rubber, of hydroxyl group-free polyether side groups, wherein said rubber mixture further comprises 10 to 300 parts by wt. of fillers, based on 100 parts by wt. of rubber, and optionally natural rubber and other synthetic rubbers, rubber auxiliaries and crosslinking agents, wherein said hydroxyl group-free polyether side group is of the formulae (I) or (II):

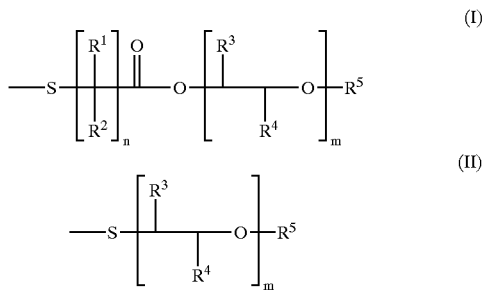

wherein

| | |
|---|---|
| $R^1$ and $R^2$ | independently of one another, is hydrogen or a $C_1$ to $C_6$-alkyl radical or a —COO—$(CHR^3$—$CHR^4$—O—$)_m$—$R^5$ radical, |
| $R^3$ and $R^4$ | independently of one another, is hydrogen or a methyl or ethyl group, |
| $R^5$ | means a linear, branched or cyclic $C_1$ to $C_{24}$-alkyl radical, $C_6$ to $C_{18}$-aryl or $C_7$ to $C_{24}$-arylalkyl radical |
| and | |
| n | is an integer from 1 to 6, and |
| m | is an integer from 1 to 100. |

4. Rubber vulcanizates comprising rubbers comprising diolefins and optionally other monounsaturated monomers wherein said rubber comprises 10 to 80 wt. % of 1,2-bound diolefins (vinyl content), wherein said diolefin comprises 0.01 to 20 wt. %, based on the total amount of rubber, of hydroxyl group-free polyether side groups, wherein said hydroxyl group-free polyether side group is of the formulae (I) or (II):

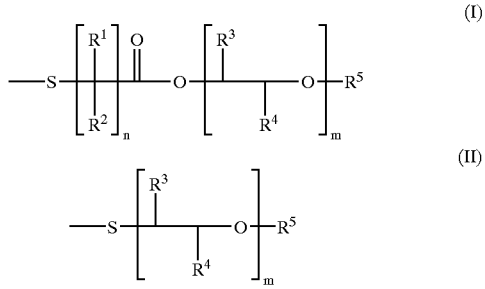

wherein

| | |
|---|---|
| $R^1$ and $R^2$ | independently of one another, is hydrogen or a $C_1$ to $C_6$-alkyl radical or a —COO—$(CHR^3$—$CHR^4$—O—$)_m$—$R^5$ radical, |
| $R^3$ and $R^4$ | independently of one another, is hydrogen or a methyl or ethyl group, |
| $R^5$ | means a linear, branched or cyclic $C_1$ to $C_{24}$-alkyl radical, $C_6$ to $C_{18}$-aryl or $C_7$ to $C_{24}$-arylalkyl radical |
| and | |
| n | is an integer from 1 to 6, and |
| m | is an integer from 1 to 100. |

5. Rubber molded articles comprising rubbers comprising diolefins and optionally other monounsaturated monomers wherein said rubber comprises 10 to 80 wt. % of 1,2-bound diolefins (vinyl content), wherein said diolefin comprises 0.01 to 20 wt. %, based on the total amount of rubber of hydroxyl group-free polyether side groups, wherein said hydroxyl group-free polyether side group is of the formulae (I) or (II):

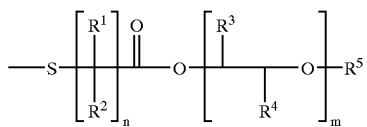

(I)

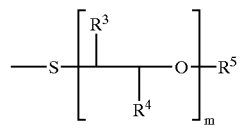

(II)

wherein

| | |
|---|---|
| $R^1$ and $R^2$ | independently of one another, is hydrogen or a $C_1$ to $C_6$-alkyl radical or a —COO—(CHR$^3$—CHR$^4$—O—)$_m$—R$^5$ radical, |
| $R^3$ and $R^4$ | independently of one another, is hydrogen or a methyl or ethyl group, |
| $R^5$ | means a linear, branched or cyclic $C_1$ to $C_{24}$-alkyl radical, $C_6$ to $C_{18}$-aryl or $C_7$ to $C_{24}$-arylalkyl radical |
| and | |
| n | is an integer from 1 to 6, and |
| m | is an integer from 1 to 100. |

6. A rubber molded article according to claim 5, wherein said rubber molded article is a tire.

7. A rubber molded article according to claim 5, wherein said rubber molded article is a tire part.

\* \* \* \* \*